(12) United States Patent
Carson

(10) Patent No.: US 7,184,979 B1
(45) Date of Patent: Feb. 27, 2007

(54) DUAL ACCOUNTS BANKING SYSTEM

(76) Inventor: Stephen P. Carson, 323 Holiday Rd., Lexington, KY (US) 40502

(*) Notice: Subject to any disclaimer, the term of this patent is extended or adjusted under 35 U.S.C. 154(b) by 967 days.

(21) Appl. No.: 09/724,816

(22) Filed: Nov. 28, 2000

Related U.S. Application Data

(60) Provisional application No. 60/186,177, filed on Mar. 1, 2000.

(51) Int. Cl.
*G06Q 40/00* (2006.01)

(52) U.S. Cl. .............. 705/35; 705/39; 705/44; 235/379

(58) Field of Classification Search ............ 705/35, 705/39, 44; 235/379, 380
See application file for complete search history.

(56) References Cited

U.S. PATENT DOCUMENTS

| | | | | |
|---|---|---|---|---|
| 5,621,201 A | * | 4/1997 | Langhans et al. | 235/380 |
| 5,708,422 A | | 1/1998 | Blonder et al. | |
| 5,826,243 A | * | 10/1998 | Musmanno et al. | 705/35 |
| 5,864,830 A | * | 1/1999 | Armetta et al. | 705/39 |
| 5,914,472 A | | 6/1999 | Foladare et al. | |
| 5,953,710 A | | 9/1999 | Fleming | |
| 5,970,475 A | * | 10/1999 | Barnes et al. | 705/27 |
| 6,021,943 A | * | 2/2000 | Chastain | 235/380 |
| 6,173,269 B1 | * | 1/2001 | Solokl et al. | 705/39 |
| 6,385,595 B1 | * | 5/2002 | Kolling et al. | 705/40 |
| 6,639,975 B1 | * | 10/2003 | O'Neal et al. | 379/112.01 |

* cited by examiner

*Primary Examiner*—Alain L. Bashore
(74) *Attorney, Agent, or Firm*—King & Schickli, PLLC

(57) ABSTRACT

A computerized banking system for handling dual accounts is disclosed. A bank database has transaction information for number one and two accounts. The computer is programmed to generate separate statements for at least the number two account, which first and second statements are provided to the number two account holder. The number one account holder does not have access to the first statement of transactions to maintain independence and privacy, but only to the second statement including specific fund transactions from said number one account. Communication between the account holders is provided by the computer through wireless devices, and the statements are generated in electronic form. The computerized method comprises related steps.

8 Claims, 2 Drawing Sheets

DUAL ACCOUNTS BANKING SYSTEM

RELATED APPLICATION

This utility application claims priority based on U.S. Provisional Patent Application Ser. No. 60/186,177, filed Mar. 1, 2000.

BACKGROUND OF THE INVENTION

The present invention relates to a system and method for operating two interacting accounts through a bank data processing computer, wherein the number one account holder is a parent or similar authorized person and the number two account holder is a student or similar authorized person.

There are prior automated banking methods that provide for interaction between multiple cards of a single bank account and multiple accounts that are tied together for transfer of credit from one to the other, and similar functions. In the past, these systems have worked with some degree of success, most notably where the single account operates in conjunction with multiple credit cards.

A prevailing theme in the prior art systems of this type is to have the number one account holder, such as a corporate officer of an employer, a parent or the like, dominate the ancillary card user, including in terms of spending limits. Usually, not only is the amount of spending controlled, but also other parameters, such as the number of expenditures per month and the nature of the products/services that can be purchased, are monitored for approval or disapproval. Depending on the number of parameters included, the dominant account holder can control each and every important aspect of the account(s). In some instances, even access to each monthly bank statement covering such account activity may be off-limits to the ancillary card user. One example of this type of credit card spending control by the dominant account holder of an ancillary card user is shown and described in U.S. Pat. No. 5,914,472, issued Jun. 22, 1999.

Another feature of these banking systems is the concept of communicating in real time with the dominant or number one account holder, such as the president of the corporation, to determine if the account holder approves and authorizes the expenditure being attempted by the subservient card user. This approach is illustrated and described in an earlier U.S. Pat. No. 5,708,422, issued Jan. 13, 1998 and owned by the same corporation as the '472 patent. As an additional feature, in the event that the dominant account holder does not respond within a given time to authorize the expenditure, the bank database computer is programmed to automatically authorize the expenditure.

In still another approach, U.S. Pat. No. 5,953,710, issued Sep. 14, 1999 separate credit or debit cards are set up for the subservient account holder and the dominant account holder. This banking system is disclosed in particular for linking a child's activity as the subservient holder with the parent's account, as the dominant holder. The number one or dominant holder sets the credit and debit limits of the child, and participates in at least some of the other banking activities of the child. Furthermore, the dominant account holder or parent is provided with the full bank statement of the account. As a consequence, the subservient account holder/child is denied any independence and privacy of his/her banking activity.

A serious shortcoming is thus prevalent with these prior art dominant/subservient banking systems, especially with regard to a situation involving joint parent and student accounts. Either when there is a single account and multiple cards, or where two accounts are used, the parent domination is present. This domination is particularly unpalatable when it comes to providing the parent a complete print-out of the student account at the end of the month.

In order to foster a better relationship between student and parent, as well as providing a better atmosphere for training the student to deal with their own finances, it is contemplated that the student should have at least some basic privacy of their own account. The only exception should be where the credit limit has to be raised based on an unexpected need or emergency, and the funds for such a particular expenditure or purchase is to be withdrawn from the parent account. It is also important that each account remain separate to obtain the maximum training benefit for the student, building of self-esteem and self-reliance and generally providing a continuation of a congenial atmosphere within the family of the student.

SUMMARY OF THE INVENTION

With the foregoing in mind, the present invention relates to a computerized system and method for operating dual bank accounts, so that the accounts are coupled, but certain basic actions of the two holders remain separated. An exception built into the system is for: (1) periodic credit or cash transfer of funds from the number one account to the number two account, and (2) the occasion of allowing an added credit (or cash) transfer for an extra, over budget expenditure or purchase on the number two account. The latter situation generally occurs at the end of a bank reporting/monthly cycle, when the credit limit is exceeded. While this banking system can be utilized for various relationships between account holders, such as employer/employee, it is believed to be most relevant with regard to parent/student or child relationship.

The number one account holder is the parent, and in the usual situation authorizes the transfer of a certain amount of funds to the number two account for the monthly cycle. The number two account for the student/child is therefore coupled with the number one account. However, according to the present invention, the dual accounts are otherwise separate, including having different banking I.D. numbers and individual monthly statements. It is particularly important that the activity statement for the number two account is blocked from the number one account holder. The student is able to build confidence, self-esteem and independence based on this system of coupled, but separate accounts.

Preferably, the two accounts are separately reported by paperless, electronic data transfer, such as by protected, individual access via the bank's Internet web site. Each account has its own pin number so that the normal monthly activity is kept secret from each other. Each month, the credit or cash infusion to the number two account appears, but no debit activity is provided to the number one account holder. Of course, the number two account may also receive income from other sources, and this amount and sources are also available only to the number two account holder.

As the student/child or number two account holder succeeds in maintaining the account trouble-free, another advantage is realized; i.e. separate credit status is established for future reference.

The extra or emergency transfer of funds is preferably performed on a real time basis. As explained more in detail below, the transmittal of the need and approval or disapproval of the number one holder for the extra infusion of credit/cash, is handled over a direct communications link with the point-of-sale location.

Assuming the approval is given, then this transaction over the imposed limit, and others like it, are reported in a separate statement section to the number one holder. Thus, while basic independence and privacy are maintained as a feature of the system, a deterrent to the student/child to overspending is provided by the prospect of disclosure of the activity and amount requiring the extra funds.

Still other advantages and features of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawing and descriptions will be regarded as illustrative in nature and not as restrictive.

BRIEF DESCRIPTION OF THE DRAWING

The accompanying drawing incorporated in and forming a part of the specification, illustrate several aspects of the present invention, and together with the description serve to explain the principles of the invention. The single drawing is a two-part schematic diagram of the preferred embodiment of the computerized banking system and illustrates the steps of the related method of the present invention.

BEST MODE OF CARRYING OUT THE INVENTION

Figure 1:
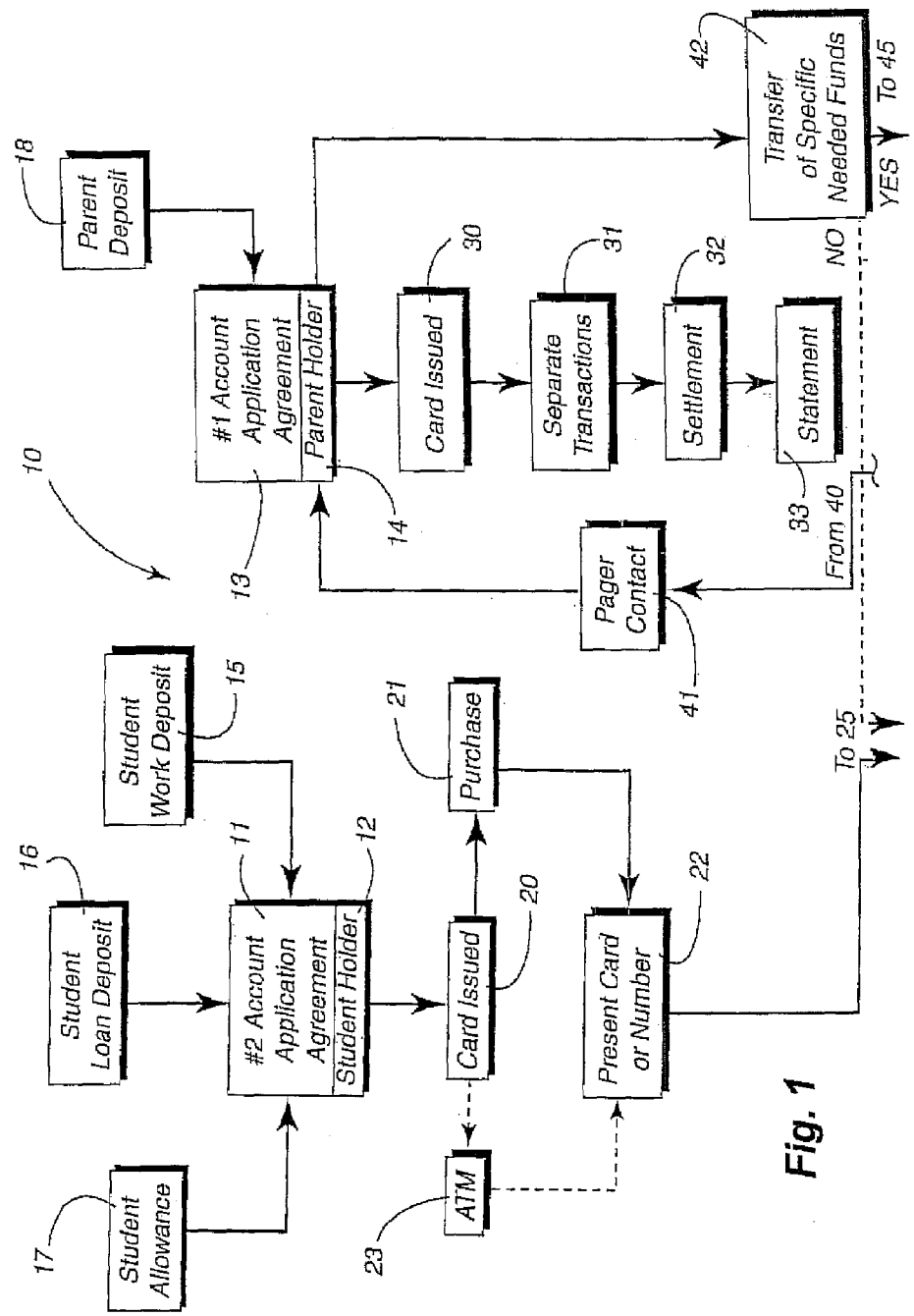
Figure 2:
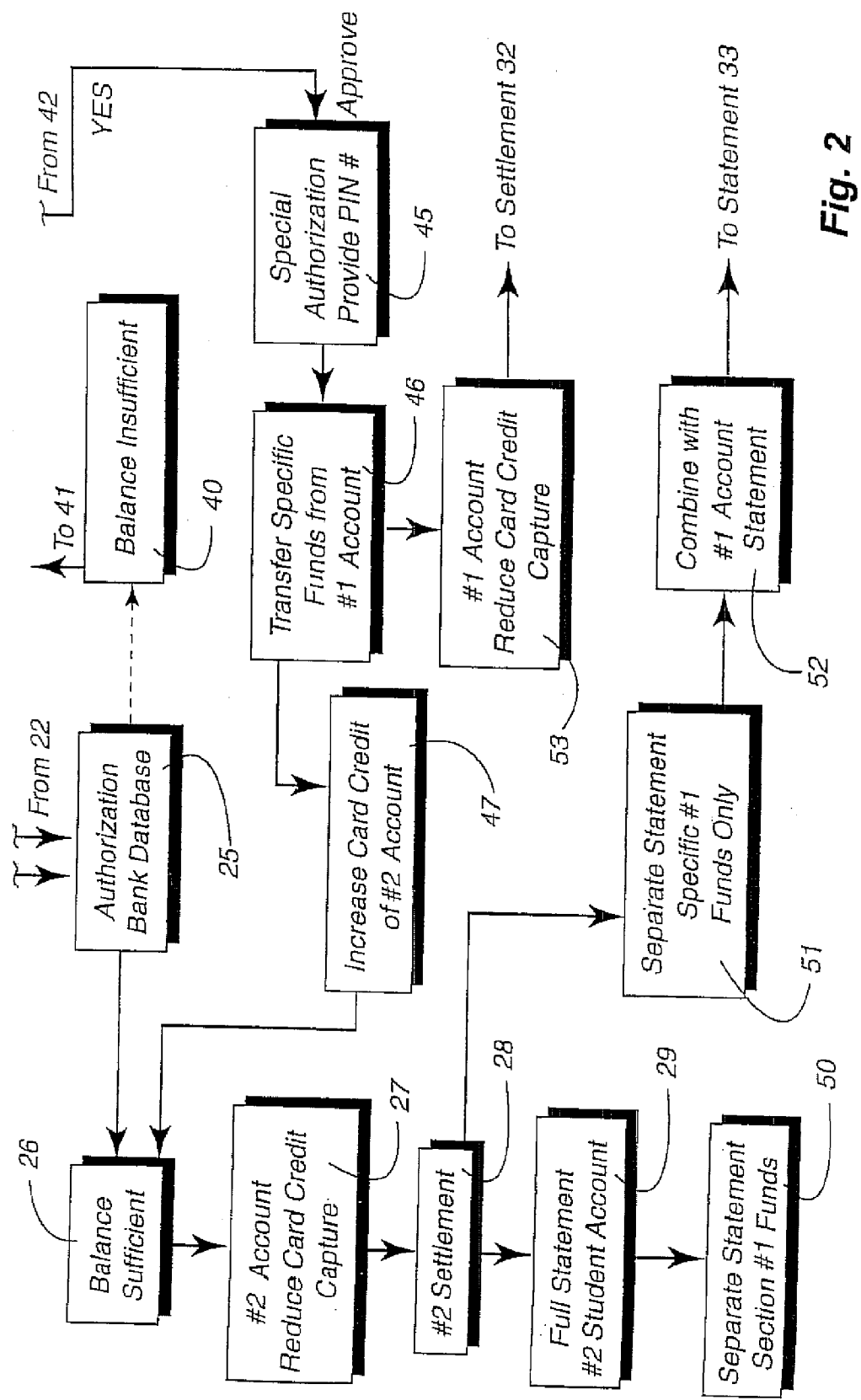

In operation, a computerized banking system comprises a computer 10, as generally designated in the drawing. The banking system is most easily implemented by software inputted into this central bank database computer, although it should be understood that the system can be a stand alone computerized system, if desired.

As a first step in the computerized system 10, a number two account 11 is established. The number two account is assigned solely to a student holder 12. Simultaneously, a number one account 13 is established by a similar, but separate application and agreement. In this instance, the number one person is parent holder 14. Each of the accounts is established separately by deposits from the individual holders. For example, the student holder 12 makes deposits through a student work deposit 15, a student loan deposit 16, such as from a bank authorized by a government program and/or a student allowance 17 from the parent or otherwise. The parent in accordance with the principles of the present invention makes his/her own deposit 18 to the number one account, separate and apart from the deposits 15–17 to the number two account.

A credit or debit card is issued to the student in step 20. This issuance of a card is performed after credit checks by the bank, based primarily on the student's own credit worthiness. At this point, a purchase can be made in step 21 by presenting the student's own credit card or number in step 22. Alternative transactions include withdrawal of cash from an automatic teller machine (ATM), as represented by the dashed line arrow to step 23.

After presenting the card by the student in step 22, the central database computer of the bank goes through the standard authorization routine in step 25. Part of the authorization is checking to see if the deposit balance or credit is sufficient, as represented by substep 26. Assuming that this is so, an action is initiated solely in the separate number two account 11; i.e. reducing the card credit level and capturing the funds from the account, as set forth in the flow chart at step 27. Settlement of this transaction within the number two account occurs at step 28, and the record of this transaction, along with all of the others within a particular bank reporting cycle, such as one month, is provided to the student holder 12 in the form of a full statement, as illustrated at reference numeral 29.

From the foregoing, it will be recognized that up until this point, the operation of the number two account 11 is completely independent of any outside influence. Specifically, at no point within the process is the number two account dominated by another person or account, such as represented by the number one account 13 and/or the parent holder 14. In effect, the student holder 12 is provided with a way to operate his/her own bank account without any concern of interference or domination of the parent. This provides for maximum comfort level for the student holder 12, and in time, a comfort level for the parent as the student learns responsible money management. The computer or computerized system 10 of the present invention is noted for providing the maximum benefits for efficient handling of finances as the student grows into adulthood. The amicable relationships between student/parent are enhanced and family values are fostered by the system.

The provision for linking of the number one account 13 with the number two account 11 is for the instance where there is a need for extra credit/cash during a bank reporting cycle of the student holder 12. The number one account 13 is set up separately and by following the usual procedures a card is issued at step 30, whereupon separate transactions 31 can occur based solely on its account balances and credit limits. The settlement step 32 occurs with each transaction and a full statement 33 for the number one account 13 is provided at the end of each bank reporting cycle.

With reference back to the number two account 11 at step 25 where authorization is being sought, if the balance of funds and/or credit is insufficient at substep 40, a communications link 41 is established with the parent, such as through a wireless pager. Of course, other communications devices, such as a wireless telephone, other standard telecommunications devices, personal computer or any other form of device can be used.

At this point, the parent holder 14 through the wireless telecommunications device performs the step 42 of either agreeing or not agreeing to provide a transfer of specific funds to accommodate the purchase being sought at step 21. If the answer is no, as indicated by the dashed line arrow to the authorization step 25, which is provided through the telecommunications device by way of the bank database computer, that is the end of the routine. The purchase or expenditure step at 21 proposed by the student is denied by the bank, and the merchant does not complete the transaction. In the event that the parent is inclined to provide the specific funds to allow the purchase at step 21, the special authorization is inputted to the telecommunications device, along with the parent's pin number, at step 45. The bank database computer then provides a transfer of the specific funds from the number one account at step 46 so as to increase the card credit limit of the number two account 11 at step 47. This in turn provides input at substep 26 where the balance of funds and/or credit limit is now effectively approved. When this occurs, steps 27–29 ending with the bank reporting cycle statement is provided to the student with a special section set up at 50 indicating the participation of the number one account 13, and in particular the funds provided at step 26. In other words, the student holder 12 at the end of the bank reporting cycle receives a full statement of the number two account 11, including a separate statement section 50 denoting the participation by the number one account 13.

Finally at step 51, the limited statement section generated at step 28 and listing only those specific funds, is provided through step 51 to be combined with the number one account statement and transferred back to step 33. This limited information to the parent holder 14 is an acceptable deterrent against the student holder 12 becoming a spendthrift. Of course, at substep 46, simultaneous with the transfer of funds to the number two account 11, the credit limit of the number one account is reduced and/or the cash funds are captured in step 53. This action is a part of the settlement step 32. As a result, the number one account balance is reduced by the amount of the specific funds that are withdrawn to provide the additional credit/cash needed at step 47, and thus cover the need in the number two account 11. Advantageously, all banking transactions, including the separate statements set up at steps 29, 33 are paperless, such as via the bank's web site and accessible only by inputting the account numbers and separate pins of the student/parent account holders 12, 14.

In summary, the results and advantages of the present computer implemented system and method can now be realized. The number two account held by the student holder 12 remains independent of the number one account 13 of the parent holder 14. As a result, the independent handling of finances can be instilled into the student without interference or domination by the parent. At the same time, extra funds, such as for an extra purchase based on need, such as an emergency, are immediately available to the student holder 12 with the parent's approval. The parent holder 14 is provided only with the limited statement section at the end of a bank reporting cycle generated at step 28. All transactions other than relating to extra funds are blocked from reporting to the number one or parent holder 14. In other words, only those specific, extra funds that have been provided from the number one account 13 to the number two account 11 are listed on the parent's statement; i.e. they are combined through step 52 with the parent's statement 33 covering the separate transactions for reconciliation. As a result, amicable family relationships are maintained, while at the same time, needed extra or emergency funds are immediately available to the student from the parent. Independence, confidence and responsible money management for the student are advantages not heretofore offered by similar coupled accounts.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

The invention claimed is:

1. A computerized banking system for dual coupled account holders comprising:
   a bank database having transaction information on coupled accounts of number one and number two accounts; and
   a computer for processing the information in said database, said computer being programmed to generate information related to transactions of the number two account to provide statements comprising first and second statement sections, both first and second statement sections being provided to the number two account holder and only said second statement section being provided to the number one account holder;
   wherein the second statement section is provided to the number one account only if the second statement section contains information related to transactions exceeding a predetermined spending limit.

2. The computerized system of claim 1, wherein said computer is programmed to electronically request authorization to provide a source of funds from the number one account holder when necessary after reaching said spending limit.

3. The computerized system of claim 2, wherein said computer is programmed to obtain electronic authorization for specific funds transfer from the number one account for transfer to the number two account.

4. The computerized system of claim 3, wherein said computer is programmed to seek and obtain authorization by a wireless device.

5. The computerized system of claim 4, wherein the wireless device is a pager.

6. The computerized system of claim 1, wherein said computer is programmed to generate said statements in electronic form for retrieval from said bank database.

7. A computerized method for banking by dual coupled account holders comprising:
   providing a bank database having transaction information on coupled accounts of number one and number two accounts;
   processing by computer the information in said database; and
   programming the computer prior to processing to generate information related to the number two account to provide statements comprising first and second statement sections, both first and second statement sections being provided to the number two account holder and only said second statement section being provided to the number one account holder;
   wherein said second statement section is provided to the number one account holder only if the second statement section contains information relating to transactions which exceed a predetermined spending limit.

8. The computer method for banking of claim 7, further including the step of programming said computer to electronically request authorization to provide a source of funds from the number one account for transfer to the number two account.

* * * * *